United States Patent [19]

Haberland

[11] Patent Number: 4,686,089
[45] Date of Patent: Aug. 11, 1987

[54] SIEVE-PLATE COLUMN FOR COUNTERFLOW EXTRACTION

[75] Inventor: Karlheinz Haberland, Bruchsal, Fed. Rep. of Germany

[73] Assignee: Wiederaufarbeitungsanlage Karlsruhe Betriebsgesellschaft mbH, Eggenstein-Leopoldshafen, Fed. Rep. of Germany

[21] Appl. No.: 833,356

[22] Filed: Feb. 25, 1986

[30] Foreign Application Priority Data

Feb. 26, 1985 [DE] Fed. Rep. of Germany ....... 3506693

[51] Int. Cl.$^4$ .......................... G21C 19/50; G21F 9/20; B01D 11/04
[52] U.S. Cl. .................................... 422/159; 422/257; 204/186; 204/302; 252/627; 252/631
[58] Field of Search ................. 261/94, 112; 204/186, 204/302; 422/159, 256, 257; 252/627, 631

[56] References Cited

U.S. PATENT DOCUMENTS

| 2,077,057 | 4/1937 | Poole | 422/257 |
| 2,215,359 | 9/1940 | Livingston | 422/256 |
| 2,258,982 | 10/1941 | Gordon | 422/256 |
| 2,662,001 | 12/1953 | Burns | 422/256 |
| 2,681,269 | 6/1954 | Bergstrom | 422/257 |
| 3,108,859 | 10/1963 | Koski | 422/257 |
| 3,854,176 | 12/1974 | Kendall | 422/257 |
| 4,247,521 | 1/1981 | Forte | 422/256 |
| 4,551,252 | 11/1955 | Boyadjiev | 422/257 |

FOREIGN PATENT DOCUMENTS

| 642370 | 6/1962 | Canada | 422/256 |
| 818912 | 10/1937 | France | 422/256 |
| 1340836 | 6/1962 | France | 422/256 |
| 318550 | 7/1969 | Sweden | 422/256 |
| 1502561 | 3/1978 | United Kingdom | 422/256 |
| 814390 | 3/1981 | U.S.S.R. | 422/257 |

OTHER PUBLICATIONS

Merz, Achivexemplar, International Meeting Fuel Reprocessing and Waste Management, Aug. 26-29, 1984, pp. 1-10.
Woodfield, A Louver-Plate Redistributor for Large Diameter Pulse Columns, Chemical Engineering Progr. Symposium, No. 13, vol. 50, 1954, pp. 14-17.

Primary Examiner—Ernest G. Therkorn
Attorney, Agent, or Firm—Walter Ottesen

[57] ABSTRACT

The invention relates to a sieve-plate column for liquid-liquid counterflow extraction of two phases which are of different weights and which are not soluble one in the other. A mixing arrangement is disposed between two sieve plates. In order to further increase cross-mixing of the phases and thus the material exchange thereof with a good rate of through-put, a static mixing element is arranged between each two sieve plates. Static mixing elements generally have, over their entire cross-section, a plurality of open channels which are arranged adjacent to each other and which extend inclinedly with respect to the direction of flow, the upper opening and the lower opening of each channel thereby being displaced radially relative to each other.

9 Claims, 6 Drawing Figures

SIEVE-PLATE COLUMN FOR COUNTERFLOW EXTRACTION

FIELD OF THE INVENTION

The invention relates to a sieve-plate column for liquid-liquid counterflow extraction of two phases which are of different weights and which are not soluble one in the other. A mixing arrangement is disposed between two sieve plates.

BACKGROUND OF THE INVENTION

For liquid-liquid counterflow extraction, use is made of extraction columns comprising a cylindrical housing in which sieve plates are fixed rigidly and in an axially distributed arrangement. The lighter phase is supplied from below while the heavier phase is supplied from above. The heavy phase is discharged at the bottom of the column while the light phase is discharged at the top of the column.

The extraction column for carrying out a liquid-liquid counterflow extraction must be adapted by means of special features to the specific requirements of the extraction process in order to accelerate the transfer of material between the phases and to increase operational reliability and availability as well as the efficiency.

It is known for sieve plates to be arranged in a rigidly fixed and axially distributed arrangement in the cylindrical housing of the extraction column. The sieve plates are intended to provide an adequate degree of quality of extraction by virtue of the fact that they cause droplets of liquid of the one phase to be formed on passing through the holes in the sieve plates. The droplet formation increases the size of the surface area of the phase. The exchange of material is advantageously affected.

In order to further improve the level of efficiency of the sieve-plate column, it is known to impart a pulsation to the liquid content. Pulsed sieve-plate columns can be of shorter height, with the same level of efficiency, than non-pulsed sieve-plate columns. However, it has been observed that the level of efficiency that was theoretically expected in the extraction operation was not achieved. As a good transfer of material depends on good mixing of the two phases, the unsatisfactory effect was hitherto attributed to re-mixing of the two phases with each other, which can occur because of a return movement of the column of liquid. That assumption was not an adequate explanation for the unsatisfactory level of efficiency as was noted in a presentation at the International Meeting Fuel Reprocessing and Waste Management, Aug. 26th to 29th, 1984, Jackson, Wyo., page 5.

In addition, it has now been found that phase channels which are formed in a flow path configuration pass vertically through the sieve-plate column. This phenomenon becomes more pronounced with increasing column diameter so that a greater length of column is required for extraction.

It was realized that the above-mentioned channel flow phenomenon must be brought to an end in order to achieve improved material exchange. In this way, consideration is taken of the situation that the driving force and speed in a material exchange in extraction columns is the concentration gradient between the receiving phase and the delivering phase. This concentration gradient should be as high as possible. In order to achieve this gradient, it is important to constantly destroy the boundary layers of the phases to bring non-loaded or less loaded phase particles to the droplets of the other phase. This can be achieved by the phases as they pass through the column in that the phases are repeatedly diverted out of the flow paths and mixed radially as far as possible. Radial mixing results in destruction of the channel flow and thereby provides a better degree of material exchange.

German published and examined patent application DE-AS No. 17 69 005 describes a column arrangement having rotatable mixing arrangements disposed between sieve plates for cross-mixing the phases. The disadvantage of these rotatable mixing arrangements lies in maintenance of the bearings and the complicated configuration thereof. When the sieve-plate column is used in nuclear reprocessing, movable components in the sieve-plate column are undesirable.

A further sieve-plate column is disclosed in the technical journal Chemical Engineering Prog. Symposium Series, 13, Vol. 50, (1954), pages 14 to 17. This sieve-plate column does not require any rotatable or movable components in the mixing arrangement. This mixing arrangement comprises a distributor plate which is disposed between the sieve plates. Angle plates project out of the plane of the distributor plate at an inclined position and at an angle of about 30°. The angle plates are bent out of the distributor plate so that apertures are present beneath the angle plates and are covered by the latter. This configuration is intended to impart a swirl to the liquid of each pulse. This distributor plate provides for a good cross-mixing effect and thus an improved material exchange between the phases. The use of the distributor plate results in an improved distribution of the concentration of material over the corresponding ones of the cross-sections of the sieve-plate column, which also has an advantageous effect on the material exchange between the phases. However, complete or adequate prevention of cross-mixing non-homogeneity cannot be achieved with this distributor plate. In this connection, reference may be made to a presentation at the International Meeting Fuel Reprocessing and Waste Management, Aug. 26th to 29th, 1984, Jackson, Wyo., page 8.

In order to produce the swirl effect, the free area of the distributor plate must be less than the free area of the sieve plate. A serious disadvantage is seen in the distributor plate because it considerably reduces the free through-flow cross-section of the sieve-plate column. The sieve nozzle-type plates which are used in the nuclear reprocessing art usually have a through-flow cross-section of about 23% (Presentation at the International Meeting Fuel Reprocessing and Waste Management, Aug. 26th to 29th, 1984, Jackson, Wyo., page 5). The distributor plate only has a through-flow cross-section of about 14% (Presentation at the International Meeting Fuel Reprocessing and Waste Management, Aug. 26th to 29th, 1984, Jackson, Wyo., page 8). If the through-flow cross-section in the sieve-plate column becomes less, the result is an undesirable drop in through-put.

Another disadvantage is considered to lie in the constricted operating range of a sieve-plate column which includes the distributor plate.

The smaller free surface area of the distributor plate can also result in a backup of liquid on the plate, which under some circumstances can result in deposits on the distributor plate.

SUMMARY OF THE INVENTION

It is an object of the invention to provide a sieve-plate column of the type described above which is so configured that a good cross-mixing of the phases is achieved at a highest possible through-put. The configuration of the column is without the use and maintenance of movable components which give rise to difficulties. The sieve-plate column is also suitable for use in nuclear reprocessing.

According to a feature of the invention, a static mixing element is disposed between two sieve plates which has a multiplicity of channels over the entire cross-section thereof. The channels are arranged adjacent to each other and extend inclinedly with respect to the direction of flow thereby causing the upper opening and the lower opening of each channel to be displaced radially relative to each other.

Static mixing elements or mixer packs of this kind are made up, for example, of lamellae. These lamellae are layered one upon the other in such a way as to form open mutually intersecting channels. Static mixing elements with a large number of guide surfaces which are arranged inclinedly with respect to the direction of flow are also known.

A multiplicity of flow ducts are provided in the static mixing element which provide for radial displacement of the flow paths which are formed. The operation involved in the cross-mixing process is strictly geometrical. There are no movable components.

The sieve plates provide for repeated drop formation and the static mixing element provides for homogeneous cross-mixing over the shortest distances without movable components. Radial displacement of the flow paths is achieved and the channel-type flow is interrupted.

The arrangement according to the invention of the static mixing element deflects the phases out of their perpendicular channel direction and thus provides for cross-mixing of the phases. The static mixing element does not cause any narrowing of the operating range of the sieve-plate column. The through-flow surface of the static mixing element is substantially greater than that of the sieve plate.

In an advantageous embodiment of the invention, static mixing elements are disposed in the upper region of the sieve-plate column in corresponding ones of the intermediate spaces between four successive sieve plates. It was surprisingly found that a very good material exchange was achieved with an arrangement of this kind. After exiting from a static mixing element, the phases are conducted through a sieve plate and the drop formation operation is started again. This procedure is repeated. By means of this arrangement, a coalescence of the phases is prevented.

The entire sieve-plate column is equipped with a static mixing element in all intermediate spaces defined by two mutually adjacent sieve plates. This configuration provides for a constant alternation with respect to cross-mixing and droplet formation of the phase passing therethrough.

If the sieve-plate column with the mixing arrangement according to the invention is used for a combined extraction operation with simultaneous electrolysis, as is possible for example in the separation of uranium and plutonium in nuclear reprocessing, then the static mixing element is formed as an electrode pursuant to another feature of the invention. The mixing element is then preferably configured as the anode.

According to another feature of the invention, the static mixing element is made from a material for neutron absorption. It can be envisaged that this neutron poisoning effect for the sieve-plate column is adequate with the arrangement of a plurality of static mixing elements according to the invention. Hafnium or boron may be used for example as the material.

Pursuant to still another feature of the invention, the static mixing element is mounted on the sieve plate without attachment means and is stable and self-supporting. The static mixing elements are in themselves stable and self-supporting and may therefore lie loosely on the sieve plates. This arrangement advantageously provides for easy handling. The latter is an aspect of substantial significance with respect to the necessary remote handling required in the nuclear area. As there is no need for special attachment configurations, there is no necessity for a separate release operation to be carried out when replacing a static mixing element.

According to another feature of the invention, the successive static mixing elements are displaced 90° with respect to each other. The static mixing elements which are arranged in succession and displaced by 90° provide a further improvement in the cross-mixing.

An advantage of the invention is that the column diameter can be reduced. The improved cross-mixing of the phases which is achieved by the configuration according to the invention makes it possible for the holes in the sieve plates to be larger or to provide a greater number of holes per sieve plate. This increases the rate of through-put which in turn makes it possible to use smaller column diameters for the same exchange of material.

Because of the smaller geometrical dimensions, smaller column diameters give a higher degree of criticality safety when the sieve-plate columns are used in the nuclear area. According to the process parameters involved, this advantage may be to such a degree that criticality installations are no longer required.

The through-put is increased by the configuration of the sieve-plate column according to the invention. The higher through-put leads to higher flow speeds in the static mixing element so that the one phase can also be divided up into drops in the channels thereof.

Because of the drop formation on the one hand and the increase in phase mixing on the other hand, the separating capability of the sieve-plate column is considerably enhanced so that the extraction lengths required are reduced.

In comparison with the distributor plate which is known from the state of the art, when the invention is used, there is no possibility of deposition of decomposition products or the like. Furthermore, the static mixing elements do not require any fixing means for fixing them in the column as they hold themselves in position and can lie on the sieve plates.

Depending on the nature of the material system to be processed, it is possible under certain circumstances to forego pulsation of the sieve-plate column by using the arrangement according to the invention. The improved cross-mixing which is attained by means of the invention, and the resulting improvement in material exchange, leads to a reduction in the dwell times and thus minimizes decomposition products, which is a factor of significance particularly in the nuclear area.

The invention provides an improved phase mixing without a reduction in cross-section and without the use of movable components in extraction columns. If the arrangement according to the invention is used in the area of nuclear reprocessing, then easy handling is an advantage with respect to the required remote handling.

The invention achieves uniform material exchange conditions.

BRIEF DESCRIPTION OF THE DRAWING

Two embodiments of the invention are described hereinafter with reference to the drawing. The drawing does not show apparatus which are known per se and which do not contribute to an understanding of the invention. Such apparatus are omitted to enhance clarity of the drawing. The drawing will now be explained wherein.

DESCRIPTION OF THE PREFERRED EMBODIMENTS OF THE INVENTION

Figure 1:
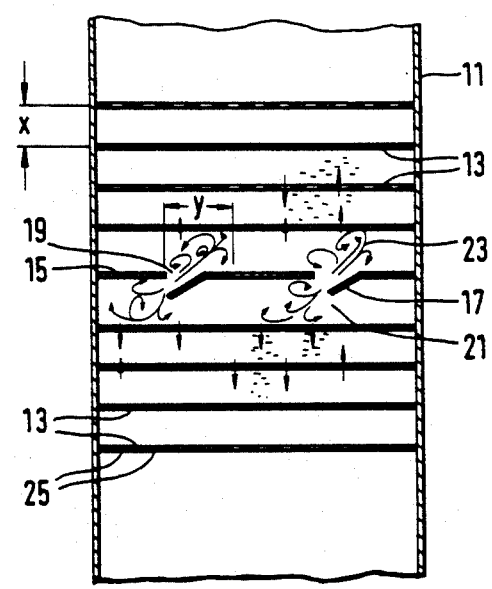
FIG. 1 is an elevation view showing a distributor plate known from the state of the art and arranged between two sieve plates.

FIG. 1 is a section view of a vertically standing sieve-plate column 11 which is known from the state of the art. The sieve-plate column 11 has sieve plates 13 mounted so as to be axially displaced one from the other. The spacing identified by the reference letter x between two sieve plates 13 is usually 50 mm in the nuclear reprocessing area. Instead of a sieve plate 13, a distributor plate 15 which is known from the state of the art is fixedly fitted into the sieve-plate column 11. The distributor plate 15 has angle plates 17 which are bent downwardly out of the distributor plate 15 and are at an angle of about 30°. The angle plates 17 were stamped out of the distributor plate 15 so that corresponding openings 19 are formed behind the angle plates 17.

If a pressure pulse is imparted to the liquid content of the sieve-plate column 11, then, during the downward stroke movement of the column of liquid, a vortex 21 is produced when the liquid passes through the openings 19. The vortex 21 imparts a swirl movement to the liquid. In the upward stroke movement of the column of liquid, a vortex 23 is formed, which also imparts a swirl movement to the liquid content.

Because of this known arrangement in the state of the art, the liquid flowing through the sieve-plate column 11 is deflected out of the flow path by an amount indicated by the reference letter y. A shower of drops of the one phase is constantly produced after passing through the holes 25 in the sieve plate 13.

Figure 2:
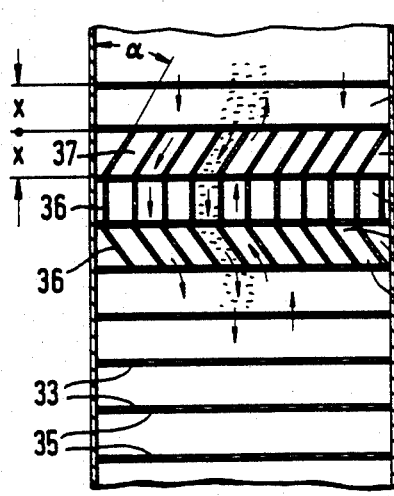
FIG. 2 shows a cutaway portion of a sieve-plate column with three static mixing elements fitted between respective pairs of mutually adjacent sieve plates.

The sieve-plate column 31 shown in FIG. 2 has sieve plates 33 which are axially distributed at the usual spacing relative to each other and which have through holes 35 therein. In the event of pulsation being imparted to the column of liquid, the holes 35 in the sieve plates 33 cause one phase to undergo drop formation. A static mixing element 36 which takes up the entire distance x is arranged between two sieve plates 33. The static mixing element 36 has open channels 37 which intersect each other and which diverge away from the longitudinal axis of the arrangement; the channels 37 extend at an angle of $\alpha = 45°$, in different directions. This configuration cannot be seen from this simplified view of the sectional surface of the static mixing element 36. However, the important consideration in this respect is only that the upper openings 39 of the channels 37 are displaced radially with respect to the lower openings 41.

Respective ones of static mixing elements 36 are also disposed in the next intermediate space between the following two sieve plates 33 and in the intermediate space following the latter, the mixing elements 36 being displaced relative to each other through 90° about the central longitudinal axis.

When the liquid passes through the static mixing elements 36, it is deflected radially out of the perpendicular. After each occasion that the liquid has passed through a static mixing element 36, the liquid is guided again through a sieve plate 33 and drop formation of the one phase is initiated again.

Figure 3:
FIGS. 3 and 4 are simplified schematic views, on an enlarged scale, showing the flow configuration within the three static mixing elements shown in FIG. 2 and illustrating only the conditions where the section view of FIG. 2 is taken.
Figure 4:
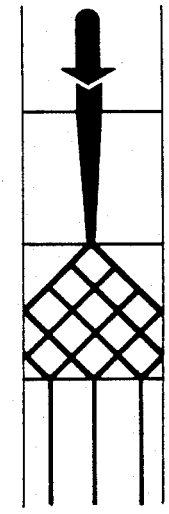

In FIG. 3 and in FIG. 4, which is rotated through 90° relative to FIG. 3, an explanatory diagrammatic view on a larger scale is provided for the flow paths within the plane of the section of the three static mixing elements shown in FIG. 2. It will be seen therefrom that flow channels which are formed in the sieve-plate column 31 are effectively interrupted and the desired cross-mixing is achieved.

Figure 5:
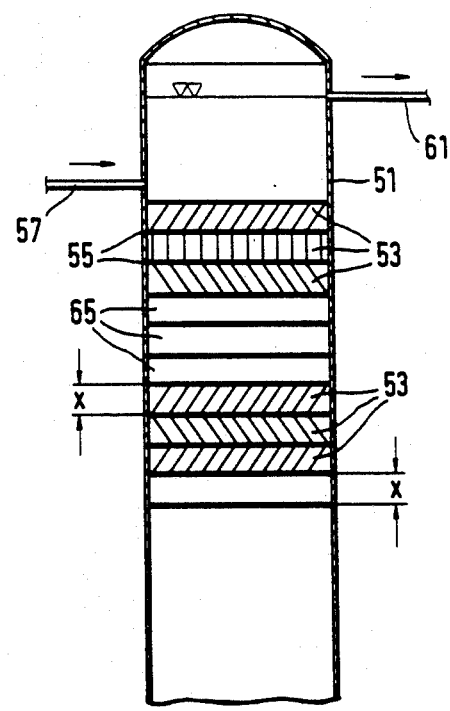
FIG. 5 shows a sieve-plate column with six static mixing elements disposed in the upper region between respective pairs of mutually adjacent sieve plates; and, FIG. 6 shows the operating range of a sieve-plate column with a distributor plate and a sieve-plate column with the mixing arrangement according to the invention.

FIG. 5 shows a sieve-plate column 51 in which six static mixing elements 53 are disposed in the upper third of the column. The mixing elements 53 are each arranged in the respective spaces between two sieve plates 55 and correspond in respect to their height to the spacing x between two sieve plates 55.

The heavy phase is introduced into the sieve-plate column 51 at the top by way of the feed 57. The light phase is supplied to the sieve-plate column 51 through the lower feed 59. The light phase is removed at the upper discharge 61 while the heavy phase is removed at the lower discharge 63. The upper three static mixing elements 53 are arranged in accordance with the configuration shown in FIG. 2. They are now followed, in a downward direction, by three free intermediate spaces 65 between the corresponding ones of sieve plates 55. Then the first of three further static mixing elements 53 is disposed in the next intermediate space. The following two intermediate spaces are provided with the other two static mixing elements 53 and are arranged in a displaced relationship relative to each other.

Figure 6:
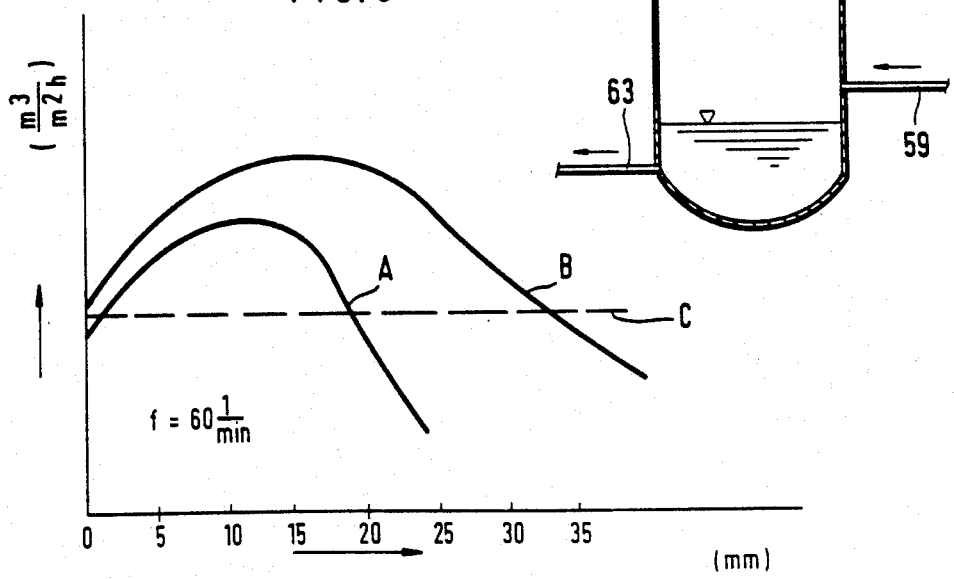

In FIG. 6, the curve-like courses (referred to in language of the art as the flooding curve) of the operating range of a sieve-plate column having a distributor plate which is known from the state of the art (curve A) is plotted against the pulse amplitude at a frequency of 1 Hz. In comparison therewith, curve B shows the operating range of a sieve-plate column equipped with the mixing arrangement according to the invention when using a static mixing element. It will be seen (see the nominal rating—straight line (C) that the sieve-plate column with the mixing arrangement according to the invention has a substantially greater operating range and the intensity of pulsation can be selected in a greater band width.

It is understood that the foregoing description is that of the preferred embodiments of the invention and that various changes and modifications may be made thereto without departing from the spirit and scope of the invention as defined in the appended claims.

What is claimed is:

1. A sieve-plate column for the liquid-liquid counterflow extraction of two phases which are of different weights and not soluble one in the other, the sieve-plate column defining a longitudinal axis and comprising:
   a plurality of sieve plates arranged transversely to said axis; and,
   a static mixing element connected directly between two mutually adjacent ones of said sieve plates for cross mixing the two phases as the latter pass therethrough, the static mixing element including a plurality of channels one adjacent the other arranged over the entire cross-section of said element, said channels communicating with apertures in said sieve plates and being inclined with respect to the direction of flow so as to cause the upper opening thereof to be radially displaced from the lower opening thereof and being arranged so as to cause a radial displacement of flow paths that are formed.

2. The sieve-plate column of claim 1, said sieve-plate column having an upper portion and four of the sieve plates of said plurality of sieve plates being disposed in said upper portion one above the other, each two mutually adjacent ones of said four plates conjointly defining an intermediate space, and, said sieve-plate column comprising three of said static mixing elements disposed in corresponding ones of said intermediate spaces.

3. The sieve-plate column of claim 2, each two successive ones of said static mixing elements being rotated 90° with respect to each other.

4. The sieve-plate column of claim 1, one of said phases being a delivering phase and the other one of said phases being a receiving phase, said phases being metered to said column so as to move therethrough in mutually opposite directions, said sieve-plate column comprising a plurality of said static mixing elements mounted in the first third of said sieve-plate column when viewed in the direction in which said delivery phase is metered to said column.

5. The sieve-plate column of claim 1, each two mutually adjacent ones of said sieve plates conjointly defining an intermediate space, said sieve-plate column further comprising a plurality of said static mixing elements mounted in corresponding ones of the intermediate spaces defined by said sieve plates.

6. The sieve-plate column of claim 1, said static mixing element being configured as an electrode.

7. The sieve-plate column of claim 1, said static mixing element being made of neutron-absorbing material.

8. The sieve-plate column of claim 1, said static mixing element being itself self-supporting and stable and being mounted so as to rest on one of said two sieve plates.

9. A sieve-plate column for the liquid-liquid counterflow extraction of two phases in a nuclear facility for reprocessing irradiated nuclear fuels, the two phases being of different weights and not soluble one in the other, the sieve-plate column defining a longitudinal axis and comprising:
   a plurality of sieve plates arranged transversely to said axis; and,
   a static mixing element connected directly between two mutually adjacent ones of said sieve plates for cross mixing the two phases as the latter pass therethrough, the static mixing element including a plurality of channels one adjacent the other arranged over the entire cross-section of said element, said channels communicating with apertures in said sieve plates and being inclined with respect to the direction of flow so as to cause the upper opening thereof to be radially displaced from lower opening thereof and being arranged so as to cause a radial displacement of the flow paths that are formed.

* * * * *